Figure 1:
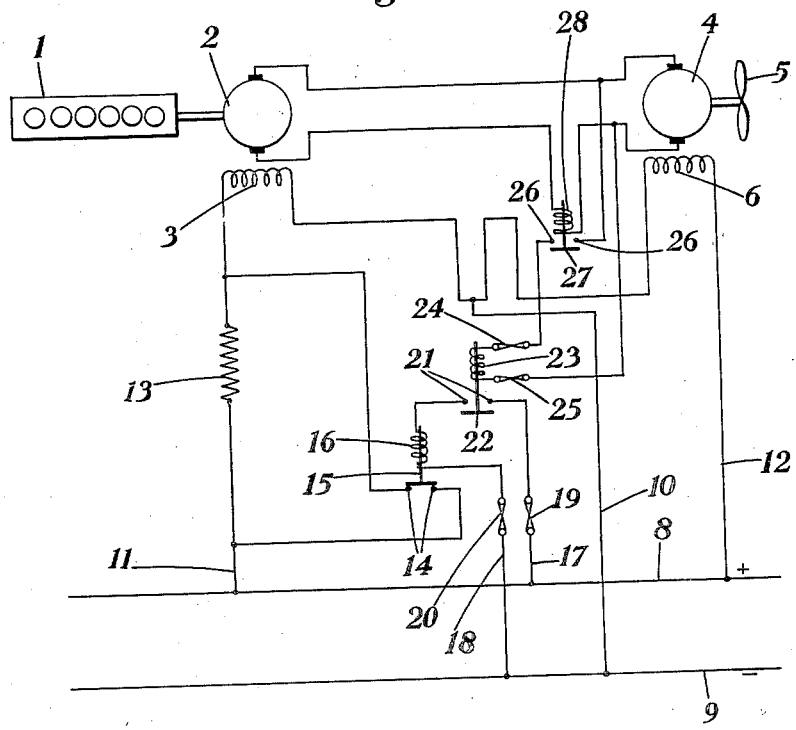

Sept. 15, 1936.   C. W. SAUNDERS ET AL   2,054,663
ELECTRIC POWER PLANT
Filed Jan. 4, 1935   3 Sheets-Sheet 1

INVENTORS
Charles W. Saunders
and George Ellis
BY
M. H. Lockwood
ATTORNEY

Sept. 15, 1936.    C. W. SAUNDERS ET AL    2,054,663
ELECTRIC POWER PLANT
Filed Jan. 4, 1935    3 Sheets—Sheet 2
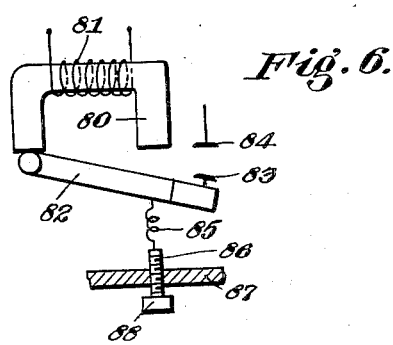
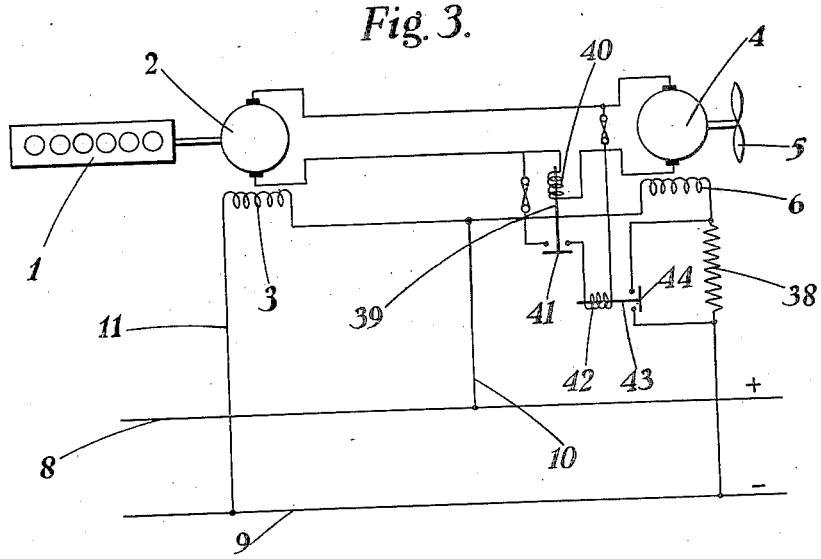
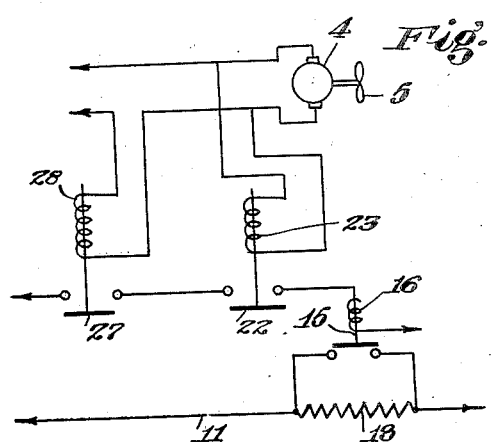
INVENTORS
Charles W. Saunders
& George Ellis
BY
M. H. Lockwood
ATTORNEY Patented Sept. 15, 1936

2,054,663

UNITED STATES PATENT OFFICE 2,054,663

ELECTRIC POWER PLANT

Charles Wallace Saunders, Bramley, and George Ellis, Shepherds Bush, London, England, assignors to The General Electric Company Limited, London, England Application January 4, 1935, Serial No. 366
In Great Britain December 6, 1933

4 Claims. (Cl. 290—14)

This invention relates to protective arrangements for electric power plant of the kind comprising a prime mover and a dynamo-electric generator adapted to supply power to an electric motor and more particularly to protective arrangements for power plant for ship propulsion. In such plant the motor or motors may be controlled in various ways. For example, the field strength of the generator or generators or motor or motors may be varied or the speed of the prime mover associated with each generator may be adjusted or both the field strength and prime mover speed may be regulated.

In the operation of plant of the kind in question not only is there danger of the motor or motors being overloaded but also the generators and prime movers may become overloaded and an object of this invention is the provision of convenient, simple and robust means for protecting the prime movers and the electrical parts of power plants.

A further object of the invention is to provide in an electric ship propulsion system improved means for avoiding danger to the electrical plant due to undesirably large currents such as may flow, for example when an inboard propeller experiences increased resistance through operation of the helm or when the rating of a motor or motors and the rating of a generator connected therewith differ substantially.

In a protective arrangement for electric power plant of the kind comprising a prime mover and a dynamo electric generator adapted to supply power to an electric motor, according to the present invention means are provided which are responsive to conditions of the power supply from generator to motor and are adapted to render effective means for limiting the power flow upon the same exceeding a predetermined value.

Thus according to one aspect of the present invention current responsive and voltage responsive relay means, responsive to conditions of the power supply are adapted in conjunction to control means for reducing the power flow when the current and voltage are above predetermined values.

Thus the current and voltage responsive means may operate to effect a reduction of the field strength of the generator and therefore of the current or power output, until the current or power output falls to a lower predetermined value.

Alternatively, the current and voltage responsive means may operate to effect an increase in the field strength of the motor, whereby the power taken from the generator will be reduced, for such time until the current or power output falls to a predetermined value.

Figure 2:
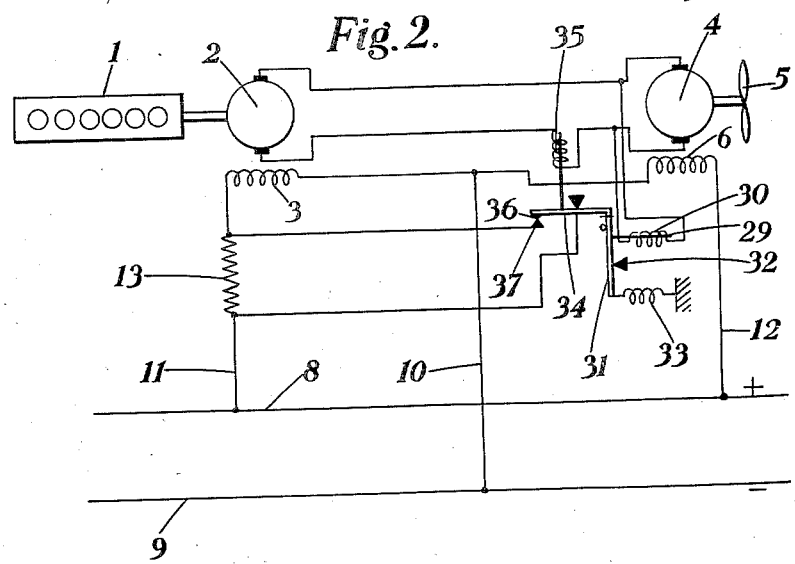

Four arrangements in accordance with the invention will now be described by way of example with reference to Figures 1 to 4 of the accompanying diagrammatic drawings of ship propulsion systems, of which Figure 1 shows an arrangement in which the insertion of a resistance in the generator field to reduce the output of the generator is controlled by cascaded current and voltage relays responsive to conditions of the main power circuits, Figure 2 shows an arrangement in which the insertion of a resistance in the generator field is controlled by mechanically interlocked voltage and current responsive relays, Figure 3 an arrangement in which control is effected on the motor field and Figure 4 an arrangement in which one motor is fed from two generators, Figure 5 shows the essential portions of a modified arrangement of Figure 1 and Figure 6 a diagrammatic showing of an adjustable relay for use in an arrangement in accordance with the invention.

In the drawings, the main current circuits and the gear shown in Figures 1, 2 and 3 are similar and are for that reason correspondingly referenced. Thus a prime mover 1 which may for example be an internal combustion engine such as a Diesel engine is coupled to a direct current generator 2 having a field 3. The output from the generator 2 is fed to the armature of a direct current motor 4 driving the screw 5 and having a field 6.

The excitation of both the motor and generator fields 3 and 6 is by current flowing therethrough from auxiliary supply bus-bars 8, 9 over lines 10 and 11, and 10 and 12 respectively.

In addition in the arrangement shown in Figure 1 a resistance 13 is inserted in series with the generator field 3. The resistance 13 is adapted normally to be short-circuited at the contacts 14 of a relay 15 which has an operating winding 16 adapted to be connected across the bus-bars 8, 9 over lines 17, 18 and fuse-isolator 19, 20, on the closing of normally open contacts 21.

The normally open contacts 21 are those of a voltage relay 22 having an operating winding 23. The operating winding 23 is connected through fuse isolators 24, 25 on closing of normally open contacts 26 of a current relay 27 across the main connections to the motor 4. The current relay 27 is of robust construction and its operating winding 28 is connected to carry part, at least, of the main generator to motor current.

The current relay 27 is such that it closes at one predetermined value of current and opens at a lower predetermined value, the said values being readily adjustable in any suitable manner. Similarly the voltage relay 22 closes at one predetermined value of voltage and opens at a lower predetermined value, the said values also being adjustable in any suitable manner.

A suitable type of relay is shown in Figure 6, which comprises a U-shaped core 80 of laminated magnetizable material on which is mounted the energizing winding 81. The movable element of the contactor comprises a bar-like element of magnetizable material 82, pivoted on one limb of the U-shaped core 80 and carries a moving contact 83 adapted to co-operate with a fixed contact 84. The armature 82 is biased to the open position by a spring 85 attached to one end of a threaded member 86 moving in a stationary part 87 and provided with a knurled operating head 88. The setting of the contactor may be varied by variation of the tension of the spring 85 by rotation of the knob 88. If the coil 81 is energized, upon the current therethrough increasing to a predetermined amount, the armature 82 moves to decrease the reluctance of the magnetic circuit. When once closed, the current may decrease below the said predetermined value but will eventually decrease to such an extent that the armature 82 moves away from the pole 80.

In operation if the current relay 27 alone operates no control is exerted, but if the voltage relay 22 operates in addition to the current relay 27, that is if the power output of the generator 2 and prime mover 1 has reached a predetermined value, then contactor 15 is opened to insert the resistance 13 in series with the generator field 3. Accordingly the generator field strength and hence the power output of the generator are reduced. The voltage and current output will thereupon fall, but not to the predetermined values. When, however, either the voltage or the current fall to the lower predetermined value, the respective relay opens and the hold-up circuit of the contactor 15 is interrupted; the contacts 14 are thereupon closed to short out the resistance 13.

In a modification of the arrangement shown in Figure 1, the voltage relay controls the energization of the current relay. Thus the coil of the voltage relay is normally energized and the contacts of the said relay normally control the circuit through the coil of the current relay, whilst the current relay controls the circuit of the contactor inserting or removing resistance from the generator field circuit. In other words, the relays 22 and 27 of Figure 1 are transposed, the voltage relay being connected directly across the main generator-motor armature circuits, while the current relay coil 27 is connected through the contacts of the voltage relay across a shunt in the main generator motor armature circuit.

In the arrangement shown in Figure 2, the general arrangement is similar and corresponding parts are similarly referenced, but there is, however, a mechanical interlock between the voltage and current relays.

The voltage relay 29 comprises an operating coil 30 connected across the main generator to motor bus-bars, and a pivoted beam 31, pivoted about a pivot 32 and biased outwardly by a tensioned spring 33 stretched between one end of the pivoted beam 31 and a stationary point. In its normal outward position, the beam 31 is arranged at its end remote from the tensioned spring 33, to engage the end of a further pivoted beam 34. The beam 34 is operated by a current coil 35, carrying at least part of the main generator-motor current and carries at its other end a contact 36 which is adapted normally to engage a contact 37 and thus to short-out the resistance 13 in the circuit of the field 3 of the generator 2.

Normally the beam 34 is prevented from tilting by engagement with the free end of the beam 31; when, however, the voltage increases beyond a predetermined limit the coil 30 attracts the beam 31 and releases the beam 34. If the main current then becomes excessive, the coil 35 operates to open the contacts 36 and 37 and thus to insert the resistance 13 into the field circuit of the generator. Both beam relays are such that on operation owing to a predetermined excess current or voltage, they do not move to their normal position until the current or voltage decreases below a predetermined limit.

In the arrangement shown in Figure 3, the control effected on the excess load on the generator is effected by cutting-out a resistance 38 in series with the motor field 6. In this arrangement, a current relay 39, having a winding 40 carrying at least part of the generator-motor current, on closing its contacts 41 makes the circuit through the coil 42 of a voltage relay 43, across the generator-motor bus-bars. The contacts 44 of the voltage relay 43 which are normally open are arranged on closing to short-out the resistance 38 and thus to increase the motor field excitation and so decrease the demand on the generator.

In this case also both current and voltage relays are such that on operating at one predetermined value of current or voltage, they do not open until the current or voltage decreases below a lower predetermined value.

In a further modification in accordance with the invention, the resistance in the motor or generator field may be controlled by a contactor (as in Figure 1) and the operation of the contactor may be determined by the closing of both current and voltage relays, their respective contacts being connected in series. The elements of such a modified arrangement of Figure 1 are shown in Figure 5 in which the corresponding parts to Figure 1 are similarly referenced and the current and voltage relays are connected in series.

Figure 4:
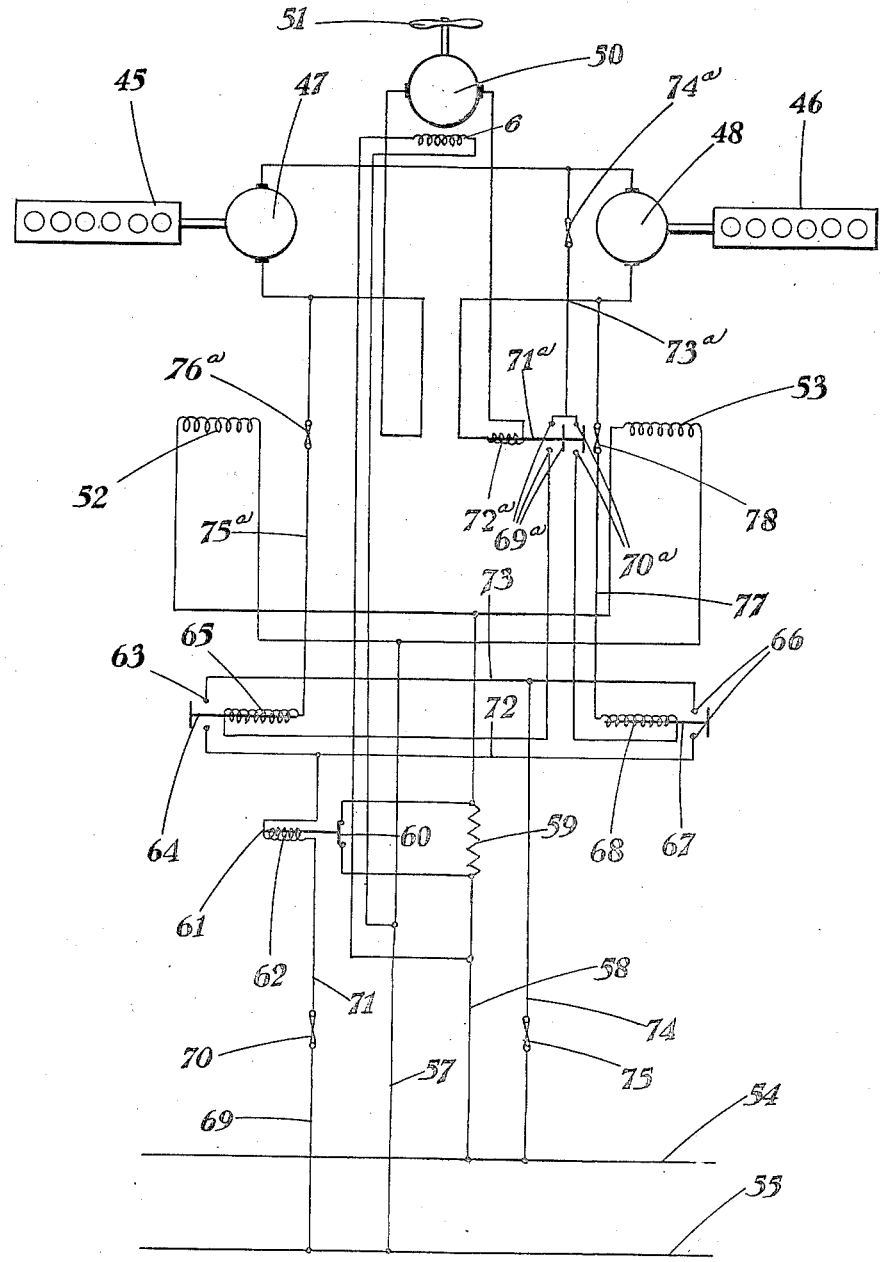

In the arrangement shown in Figure 4, two prime mover and generator sets are provided, each comprising a prime mover 45 or 46 (for example a Diesel engine) driving a direct-current generator 47 or 48, and connected in series to feed a propulsion motor armature 50 driving the screw 51. The fields 52 and 53 of the generators 47 and 48 respectively are connected in parallel and are supplied from auxiliary supply bus-bars 54 and 55, over the lines 57 and 58. A resistance 59 is connected in the line 58 and is arranged normally to be short-circuited by the closed contacts 60 of a contactor 61 having an operating winding 62.

The circuit to the operating winding 62 of the contactor 61 is arranged to be made either by the closing of normally open contacts 63 of a voltage relay 64 comprising an operating coil 65 and associated with the generator 47, or by the closing of normally open contacts 66 of a voltage relay 67 comprising an operating coil 68 and associated with the generator 48.

The contacts 63 and 66 are connected in parallel and the closing of either completes a circuit from bus 55 over line 69, fuse 70, line 71, coil 62, line 72, line 73 and line 74 and fuse 75 to bus 54.

The circuits to the coils 65 and 68 of the voltage relays 64 and 67 are arranged to be completed on the closing of contacts 69ª, 70ª of a normally open current relay 71ª having an operating winding 72ª which is connected in series with the main generators to motor circuit; the coils 65 and 68 on closing of the contacts 69ª, 70ª are connected over common line 73ª and fuse 74ª and either line 75ª and fuse 76ª or line 77 and fuse 78, so as to be responsive to the voltage of the associated generator 47 or 48.

The general arrangement is such that either or both the generators 47 and 48 may supply power to the motor 50, so that on excess power being delivered, the current relay 71ª will first operate and then the respective voltage relay. Thus protection is given whether a single generator is in operation or both generators are in operation.

As before, the current and voltage relays are set to operate, i. e. close, at a predetermined high level and then not to open until the current or voltage has decreased below a predetermined low value. Moreover, since these settings are adjustable, by known means such as relay and contactor air gaps, spring tension or adjustable resistance in circuit with the operating coil, the relays may be adapted to serve for a considerable range of power outputs and if for any reason it is desired to "derate" a generator the settings of the relays may readily be adjusted in order to attain the desired result. A relay of this adjustable type is shown in Figure 6.

One great advantage of the protective system described above is that the protection is not dependent on voltage alone or on current peaks alone. Hence during manoeuvring current peaks which will not cause overloads are permitted but upon the occurrence of any current peak accompanied by a voltage such that the engine would be overloaded the protective means at once operates. As a result the engine may be safely kept loaded to its maximum safe limit and ample power is available for the purpose of effecting rapid manoeuvring of the vessel.

We claim:—

1. An electric power plant comprising a prime mover, a generator arranged to be driven by the prime mover, a motor arranged in circuit with the generator to be driven by current therefrom, field coils for the generator and motor respectively, individual current and voltage relays arranged to be responsive respectively to predetermined current and voltage values in the generator to motor circuit, means including a resistance of fixed value permanently in circuit with one of said field coils for limiting the power flow in the generator to motor circuit and means for rendering said limiting means effective by the simultaneous operation of said current and voltage relays, said relays being so operated only when the respective values of the current and voltage in the generator to motor circuit simultaneously exceed said predetermined values.

2. An electric power plant comprising a prime mover, a generator and a motor, said generator being driven by the prime mover and in circuit with and adapted to deliver current for driving said motor, field coils for the generator and motor respectively, individual current and voltage relays arranged to be responsive respectively to predetermined current and voltage values in the generator to motor circuit, a resistance of fixed value permanently in circuit with one of said field coils and arranged to be rendered effective for limiting the delivery of power to the motor, means controlled by the current and voltage relays for rendering said field resistance effective to limit said power delivery only when both relays are simultaneously operated, said relays being so operated only when the respective current and voltage values in the generator to motor circuit simultaneously exceed said predetermined values.

3. An electric power plant comprising a prime mover, a generator and a motor, said generator being driven by the prime mover and in circuit with and adapted to deliver current for driving said motor, field coils for the generator and motor respectively, individual current and voltage relays arranged to be responsive respectively to predetermined current and voltage values in the generator to motor circuit, a resistance of fixed value permanently in circuit with the generator field coil for limiting the power delivered to the motor, a circuit including contacts for normally short circuiting said resistance and means controlled by the respective current and voltage relays when operated simultaneously for opening said contacts and rendering said resistance effective for limiting the power delivered to the motor, simultaneous operation of said relays being effected only when the respective current and voltage values in the generator to motor circuit simultaneously exceed said predetermined values.

4. An electric power plant comprising a prime mover, a generator and a motor, said generator being driven by the prime mover and in circuit with and adapted to deliver current for driving said motor, field coils for the generator and motor respectively, individual current and voltage relays arranged to be responsive respectively to predetermined current and voltage values in the generator to motor circuit, a resistance of fixed value permanently in circuit with the motor field coil for limiting the power delivered to the motor, a circuit including contacts normally open for short-circuiting said resistance, and means controlled by the respective current and voltage relays when operated simultaneously for closing said contacts and short-circuiting the resistance for limiting the delivery of power to the motor, said relays being effective only when the respective current and voltage values in the generator to motor circuit simultaneously exceed said predetermined values.

CHARLES WALLACE SAUNDERS.
GEORGE ELLIS.